Sept. 29, 1964 D. S. CAMPBELL ETAL 3,150,782
HIGH CAPACITY DRAFT GEAR
Filed Aug. 29, 1962 8 Sheets-Sheet 2

Inventors
David S. Campbell
and Eldred H. Natschke.
By
Mann, Brown & McWilliams
Attys.

Sept. 29, 1964    D. S. CAMPBELL ETAL    3,150,782
HIGH CAPACITY DRAFT GEAR
Filed Aug. 29, 1962                        8 Sheets-Sheet 3

Inventors
David S. Campbell
and Eldred H. Natschke
By Mann, Brown & McWilliams
Attys.

Sept. 29, 1964    D. S. CAMPBELL ETAL    3,150,782
HIGH CAPACITY DRAFT GEAR
Filed Aug. 29, 1962    8 Sheets-Sheet 6
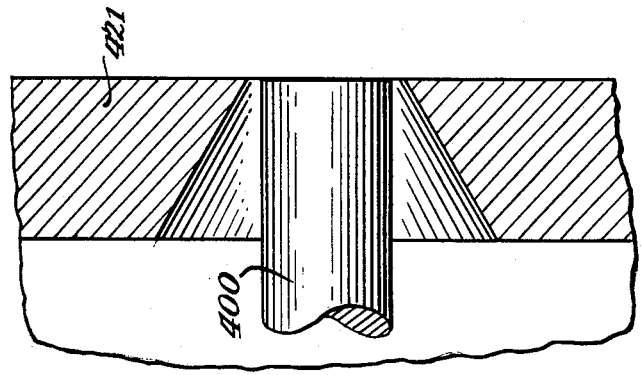
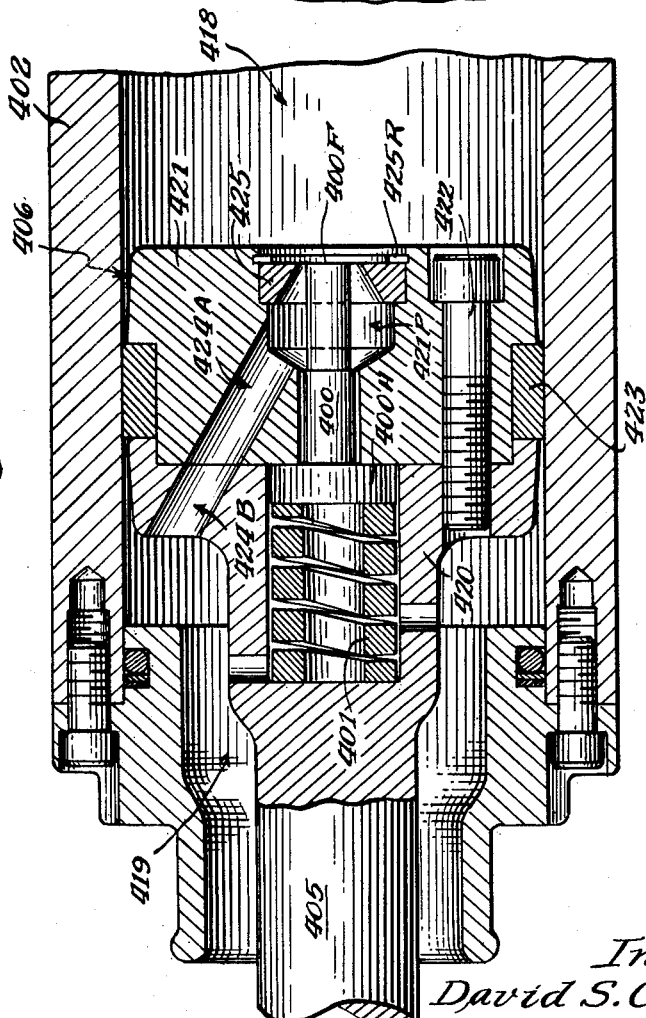
Inventors
David S. Campbell
and Eldred H. Natschke
By Mann, Brown & McWilliams
Attys.

Sept. 29, 1964     D. S. CAMPBELL ETAL     3,150,782
HIGH CAPACITY DRAFT GEAR
Filed Aug. 29, 1962     8 Sheets-Sheet 7
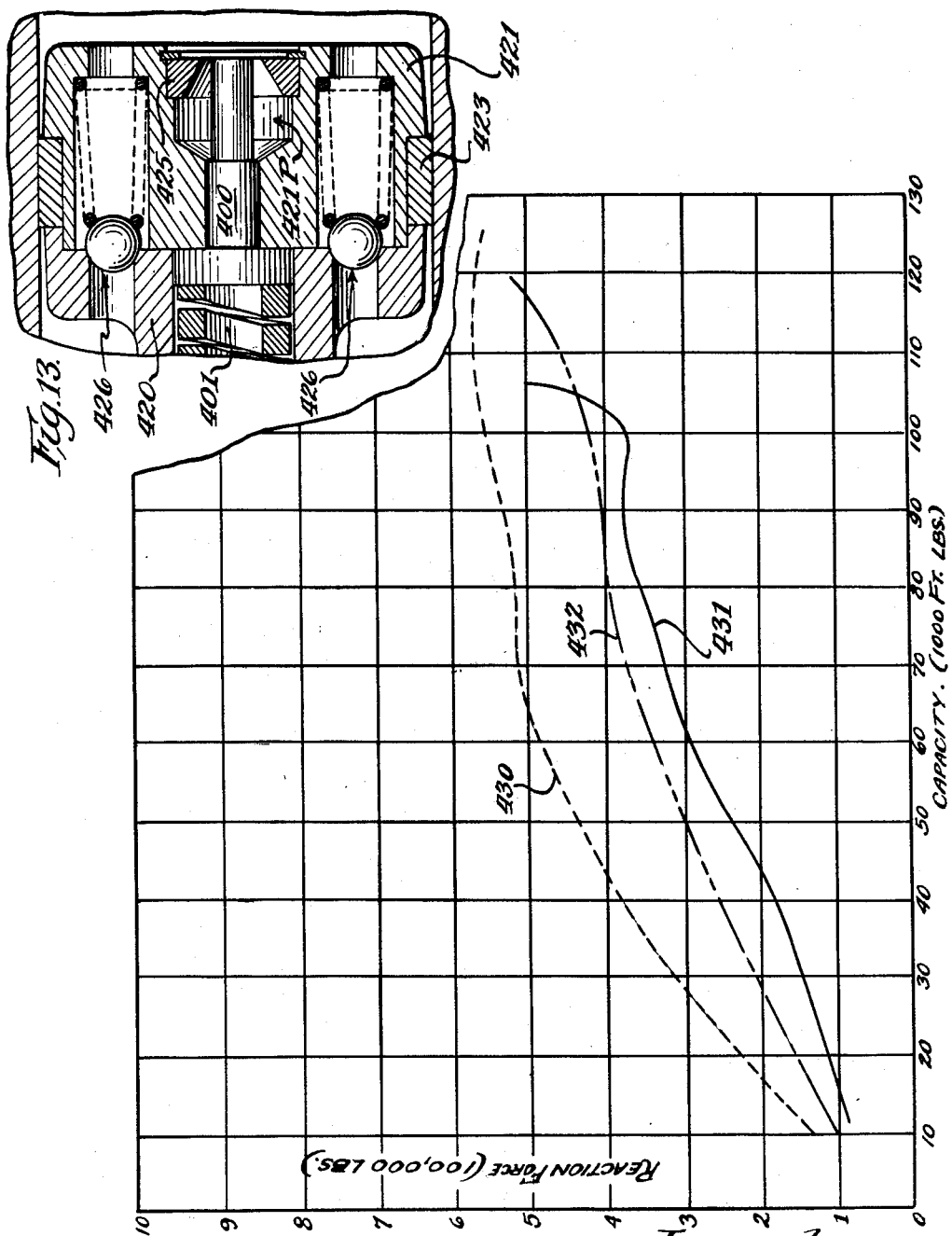
Inventors
David S. Campbell
and Eldred H. Natschke
By Mann, Brown & McWilliams
Attys.

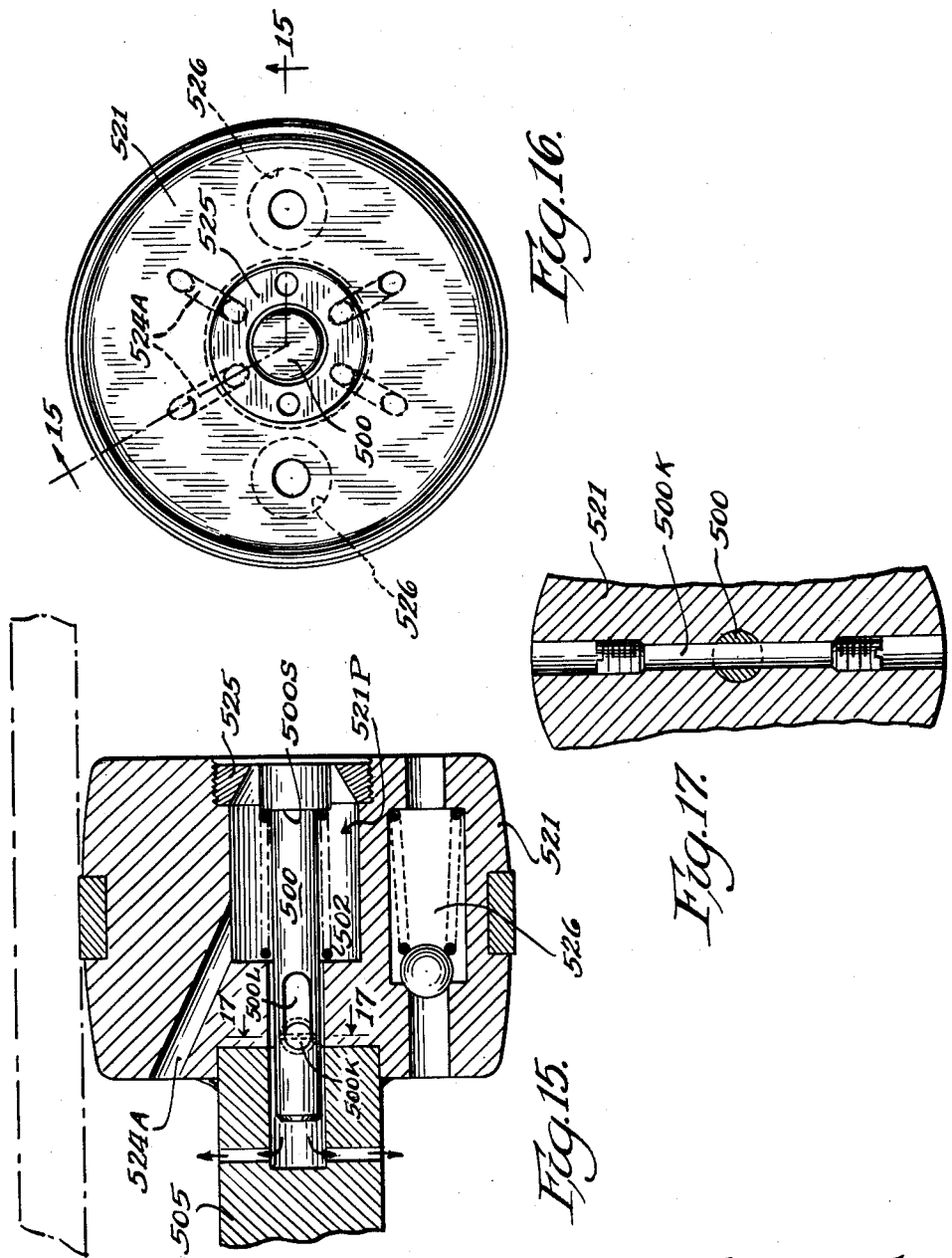

United States Patent Office 3,150,782
Patented Sept. 29, 1964

3,150,782
HIGH CAPACITY DRAFT GEAR
David S. Campbell, Glen Ellyn, and Eldred H. Natschke, Bourbonnais, Ill., assignors to Cardwell Westinghouse Company, a corporation of Delaware
Filed Aug. 29, 1962, Ser. No. 220,323
23 Claims. (Cl. 213—43)

This invention relates to draft gears for railroad cars and more particularly is concerned with a draft gear incorporating hydraulic and spring cushioning elements in parallel arrangement for conjointly resisting closure travel of a friction clutch element.

It is known to use hydraulic and spring cushioning elements acting conjointly against a friction clutch element and, in theory, such an arrangement offers a number of operating advantages such as high capacity and variable resistance to closure proportional to closure speed. However, the incorporation of a hydraulic cushioning element in a friction clutch type draft gear arrangement meets a number of problems that require solution for achieving a commercially practicable draft gear application. Under numerous conditions of buff loading, a draft gear after responding to a primary buff shock, must restore as rapidly as possible for handling secondary buff shocks. The presence of a hydraulic cushioning element in such a gear tends to retard the speed of recovery due to the fact that its expansion rate is substantially slower than that of a free spring.

Moreover, where the hydraulic cushioning element is returned rapidly, excessive pressures are built up in its low pressure side and ultimately serious seal problems develop until the hydraulic element becomes ineffective for its principal purpose of creating maximum resistance to primary buff shocks.

Accordingly, it is the principal object of this invention to provide an improved draft gear utilizing a hydraulic cushioning element operating in conjunction with a fricclutch element in an arrangement that eliminates the above mentioned problems.

Another object of the invention is to provide a high capacity draft gear incorporating parallel arranged spring cushion and hydraulic cushion elements acting conjointly to set up a force multiplying friction clutch element and arranged to accommodate rapid return of the friction cultch element by means of the spring cushioning element while the hydraulic element expands independently and at a slower rate.

Another advantage offered by this invention is the provision of a friction clutch type draft gear having a hydraulic element that adapts to the action of the friction clutch to provide a closure characteristic that presents a substantially uniform and high reaction force throughout the closure stroke. The efficiency of a friction clutch may vary over a period of time. When the clutch parts are clean the clutch is efficient and does more work. If the clutch parts are rusty the clutch is less efficient and does less work. In order for the gear to maintain its intended capacity the hydraulic element must adapt automatically in accordance with changes of the clutch efficiency.

Therefore, another object of the invention is to provide a high capacity draft gear utilizing a hydraulic cushioning element operating in conjunction with a friction clutch element wherein the hydraulic cushioning element exerts a fluid throttling function that is dependent upon the fluid pressure conditions in the hydraulic element.

A more specific object of the invention is to provide a high capacity draft gear utilizing a hydraulic cushioning element operating in conjunction with a friction clutch element such that the resistance developed by the hydraulic element determines the lateral friction force set up in the friction clutch and wherein the hydraulic element incorporates a spring loaded shiftable pin mounted to vary the size and hence the resistance offered by its fluid throttling orifice so as to provide higher reaction when functioning in conjunction with an inefficient clutch and to provide lower reaction when functioning with an efficient clutch.

Other objects and advantages will become apparent during the course of the following description.

In the accompanying drawings forming a part of this specification and in which like numerals are employed to designate like parts throughout the same:

FIG. 11 is a lengthwise sectional view through the cylinder and piston head region of a pressure responsive variable orifice type hydraulic cushioning element;

FIG. 12 is an enlarged detailed sectional view of the orifice configuration in the piston head arrangement of FIG. 11;

FIG. 13 is a lengthwise sectional view on a different plane through the piston head of FIG. 11;

FIG. 14 is a pressure vs. capacity graph for a gear incorporating the piston head arrangement of FIGS. 11 to 13;

FIG. 15 is a lengthwise sectional view through an alternative form of piston head utilizing a pressure responsive variable orifice;

FIG. 16 is a face view of the piston head of FIG. 15; and

FIG. 17 is a fragmentary sectional view taken on the line 17—17 of FIG. 15.

Figure 1:
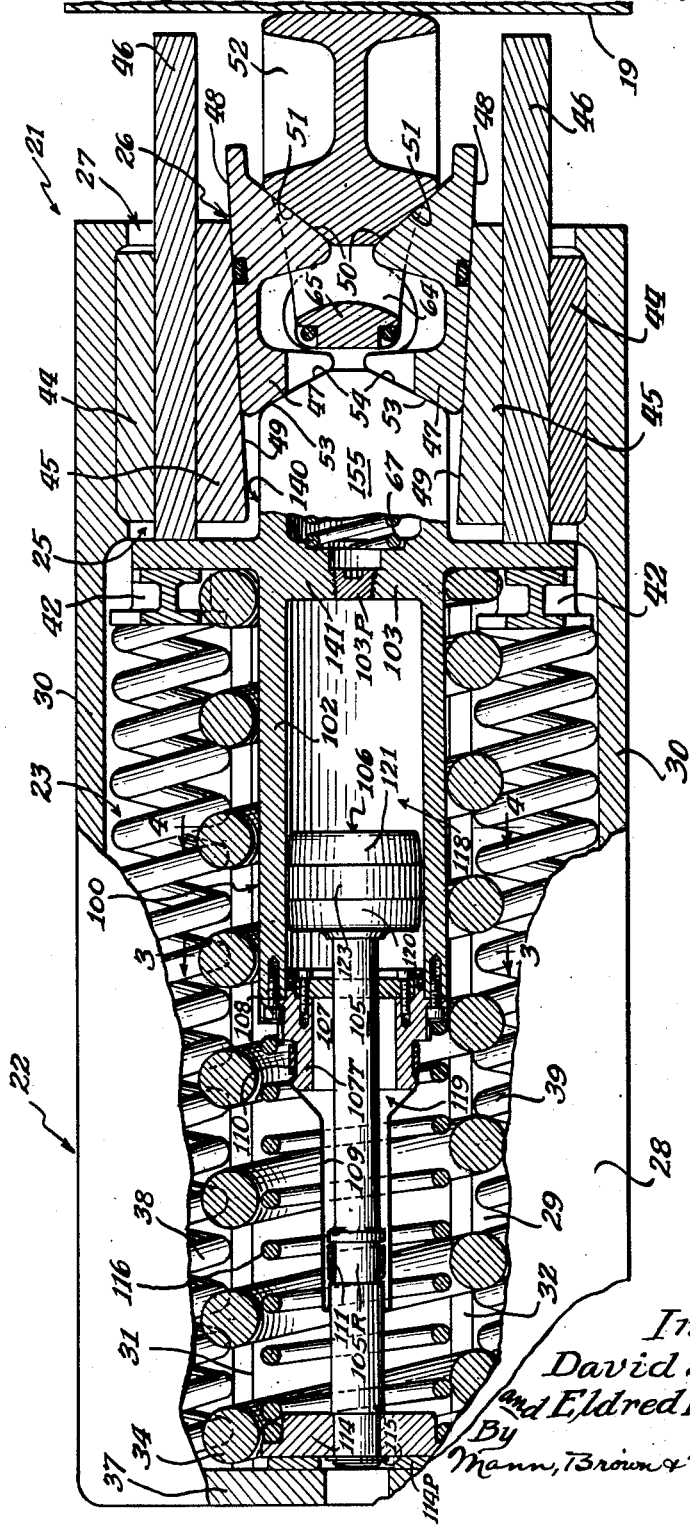
FIG. 1 is a horizontal section through a draft gear of this invention, with the gear being shown in full release position.
Figure 2:
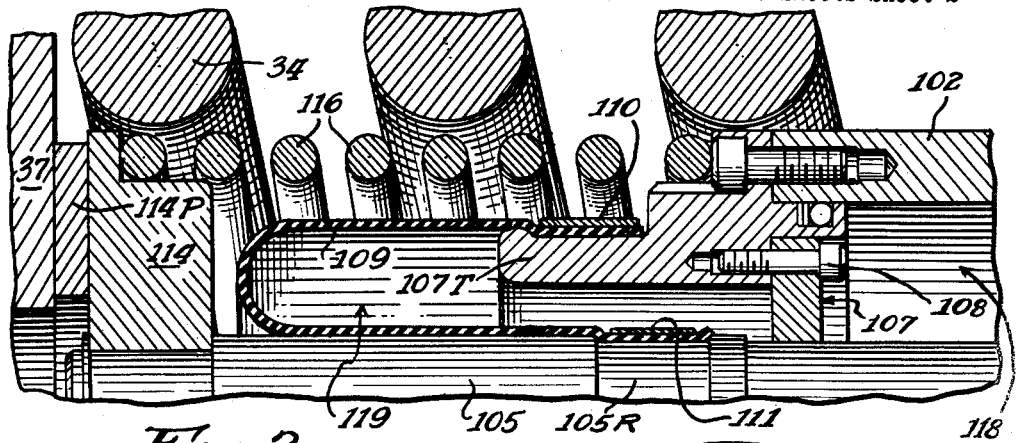
FIG. 2 is an enlarged fragmentary horizontal sectional view of the rear portion of the gear illustrating the relation of certain parts when the gear is in closed position.
Figure 3:
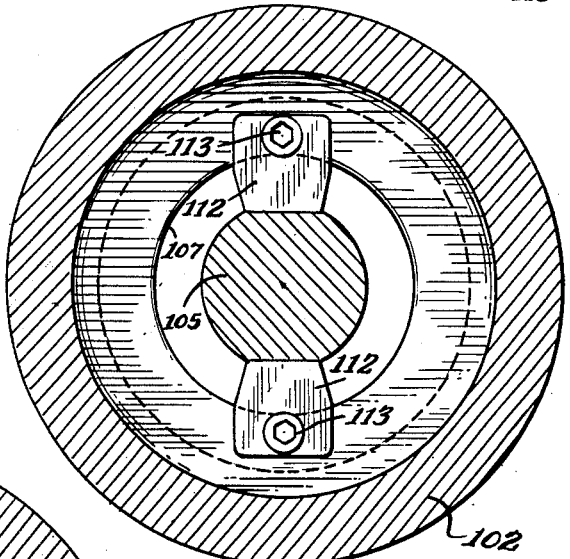
FIG. 3 is a transverse sectional view through the hydraulic cushioning element of the gear and is taken approximately on the line 3—3 of FIG. 1.

For purposes of disclosure, a presently preferred form of draft gear constructed in accordance with this invention is illustrated in FIG. 1 and is designated generally as 21. The illustrated gear 21 is intended for application in 36 inch draft pockets and has a length of 33¾ inches in its full release position and is arranged to accommodate a nominal gear closure travel of 4½ inches. Such a 36 inch draft pocket, draft gear application, is illustrated in FIGS. 1 and 2 of Campbell Patent No. 2,916,-163 and the gear illustrated herein for purposes of disclosure has many parts of identical construction and arrangement to the parts of the gear shown in FIG. 3 of the aforesaid Campbell patent, and such corresponding parts bear identical reference characters.

Gears of this basic arrangement are also contemplated for standard 24⅝" draft pockets, for tandem draft gear applications, for application at locations centrally of the car frame and for all similar applications where a high capacity cushioning element is required.

Thus, the present draft gear 21 includes a housing 22 providing a rear chamber 23, for a main spring cushioning element 34 that encircles and extends parallel with a hydraulic cushioning element or unit designated generally as 100, and the housing provides a front chamber 25 for a friction clutch element, designated generally as 26, with the front chamber 25 being in open communication with the rear chamber 23 and having an opening 27 through the front of the housing.

The draft gear housing 22 is a rectangular hollow steel casting having top, bottom, and side walls designated respectively 28, 29 and 30, with the portions of each of the top and bottom walls that define the rear chamber 23 each being formed with a pair of laterally spaced apart, parallel, longitudinally extending, integral ribs 31 and 32. The ribs 31 and 32 partially define the mounting chamber for the main coil spring cushioning element 34 and the hydraulic cushioning element 100. In addition, the ribs 31 partially define an auxiliary spring chamber, the top and bottom portions of which receive individual corner coil springs 38, while the ribs 32 partially define a separate auxiliary chamber, the top and bottom portions of which receive individual corner coil springs 39. The auxiliary spring chambers are spaced apart laterally and extend parallel to the main spring chamber on opposite sides thereof. The corner coil springs 38 and 39 are also adapted to be compressed against the integral rear wall 37 which is arranged transversely of the housing and functions as a stationary rear follower.

A spring seat 140 in the form of an intermediate follower and wedge member is located forwardly of the cushioning elements 34 and 100 and includes a chambered box-shaped casting integral with a base plate 141 transversely of the housing and providing a seat for the forward end of the coil spring 34. Auxiliary spring seats 42 are disposed in the auxiliary spring chambers between the forward ends of the corner springs and the base plate 141. One of the auxiliary spring seats 42 cooperates with the two corner springs 38 and the other of the auxiliary spring seats 42 cooperates with the two corner springs 39 to take optimum advantage of the guiding action of the ribs 31 and 32 and better synchronize the operation of the parallel corner spring elements. It will be apparent that individual auxiliary spring seats can be provided for each corner spring.

The friction clutch element 26 is located in the front chamber 25 of the housing forwardly of the base plate 141 and includes groups of intercalated plates, of which 44 and 45 are stationary and 46 is movable. Between the stationary plates 45 of each group are located a pair of laterally spaced apart wedge shoes 47 having oppositely outwardly facing friction surfaces 48 cooperating with inwardly facing friction surfaces 49 on the stationary plates 45. The wedge shoes 47 have forward wedge surfaces 50 cooperating with similar wedge surfaces 51 on a central plunger 52 and rearward wedge surfaces 53 cooperating with like surfaces 54 on the forward end of a chambered box-shaped casting 155 integral with and projecting forwardly from the base plate 141. A movable front follower for the gear is sketched at 19 at the right hand end of FIG. 1 and it is arranged for engagement with the front end of the casting to act as a positive abutment for limiting gear closure to 4½ inches in the case of a gear for a 36 inch pocket. The follower 19 is to engage fixed stops (not shown) normally provided on the center sills of a railway car frame.

The central plunger 52 includes a pair of vertically spaced rearwardly extending, parallel arms 64, bridged by a transverse wall 65 presenting a seat for a release spring 67 of the coil type which is located within the chambered casting 155 and constantly urges the plunger 52 towards its release position.

The friction clutch 26 is of a force multiplying type in that it sets up multiplied lateral forces in its friction system in accordance with the resistance force offered by the yieldable elements of the gear. In this case the resistance force is developed by the springs 34, 38 and 39 and the velocity responsive hydraulic element 100. The particular friction clutch illustrated herein is preferred because the effectiveness of its friction system increases markedly with increasing loads and travel. It will be apparent, however, that the invention contemplates the use of other friction clutches, particularly, those of the so-called force multiplying type.

In the embodiment of FIG. 1 the hydraulic cushioning element 100 is of the self-restoring hydraulic fluid throttling type and includes a cylinder sleeve 102 sealed at its front end by an end cap 103 having a removable fill plug 103P threadedly engaged in sealing relation therein. As illustrated herein, it is preferred that the spring seat 140, the cylinder sleeve 102 and the end cap 103 be formed as integral parts of a one piece casting. While these parts may be formed separately and secured by welding, thermal stress problems created by the welding procedure can distort the desired shapes and the unitary construction avoids all such problems. A ram 105 extends into the cylinder sleeve through its rear end and carries a piston 106 that is reciprocably operable within the cylinder sleeve. A ring-like cylinder cap 107 is nested in the rear end of the cylinder sleeve and is secured in place by a set of cap screws 108. A sleeve shaped boot 109 of generally flared configuration has its larger end sealed upon a tubular end projection 107T of the cylinder cap by means of a clamp 110 and has its smaller end reverse folded and sealed upon a reduced section 105R of the ram by means of a clamp 111. A pair of anti-rotation keys 112 (see FIG. 3) are fixed to the cylinder cap 107 by cap screws 113 and project radially inwardly to terminate in flat contact faces for relatively slidable guiding engagement with lengthwise flats provided along the ram and this prevents turning of the ram and protects the boot against pleating and ultimate rupture.

At its rear end the ram 105 is formed to receive a spring seat 114 held in place by a retainer ring 115 with a return spring 116 encircling the ram 105 and boot 109 to react between a peripheral shoulder of the spring seat 114 and a peripheral shoulder of the cylinder cap 107.

In the illustrated draft gear arrangement, the hydraulic cushioning element is located to react between the rear wall 37 of the housing and the base plate 141 of the spring seat 140. The spring seat 114 at the rear end of the gear is equipped with a spacer pad 114P as a cushion against any hammering effect. This pad may be eliminated, if desired.

During closure of the gear the spring seat 140 is driven rearwardly into the draft gear housing 22 to move the cylinder sleeve 102 of the hydraulic unit rearwardly and thereby cause relative inward movement of the piston 106 through the sleeve. During such movement, hydraulic fluid is displaced from the cylindrical high pressure chamber 118 at the front end of the cylinder sleeve 102 to the annular low pressure chamber 119 bounded by the rear of the sleeve 102 and the boot 109. The loss of volume within the cylinder sleeve occasioned by inward travel of the single ended ram 105 is accommodated by an accumulator action provided by changes in the boot contour.

The closure travel of the spring seat 140 is resisted jointly by the hydraulic cushioning element, the spring coil 34 and the corner coil springs 38 and 39, while the return movement of the spring seat and the remainder of the friction clutch is caused by expansion of the spring coil 34 and the corner springs 38 and 39 which release much faster than does the return spring 116 of the hydraulic cushioning element. Because of the relatively slow expansion of the hydraulic cushioning element 100, it is carried forwardly with the spring seat 140 as provided by its welded connection thereto. This movement of the hydraulic cushioning element 100 carries the rear spring seat 114 and pad 114P forwardly of the rear housing wall 37 and the subsequent controlled expansion of the hydraulic unit gradually returns these parts to the rear wall 37. It may be noted that the main coil spring 34 acts as a guide housing for maintaining the hydraulic unit centered during its independent expansion movement.

The release of the friction clutch element 26 by the main coil spring 34 and the corner coils 38 and 39, which make up the conventional spring system of the gear, is accomplished in one or two hundredths of a second as compared with an expansion time for the hydraulic unit on the order of 1.3 seconds. The conventional spring system affords adequate capacity for handling secondary shocks occurring prior to recovery of the hydraulic cushioning element 100.

The relatively slow controlled recovery of the hydraulic element avoids the creation of dangerously high pressures in the low pressure chamber 119 during expansion of this element and, therefore, protects the seal associated with the low pressure chamber. Were the hydraulic unit to be restored under the action of the relatively strong main coil spring 34 and/or the corner springs 38 and 39, dangerous pressures would be developed in the low pressure chamber. Moreover, the hydraulic element would tend to retard release of the gear and impair its ability to handle secondary shocks.

Figure 4:
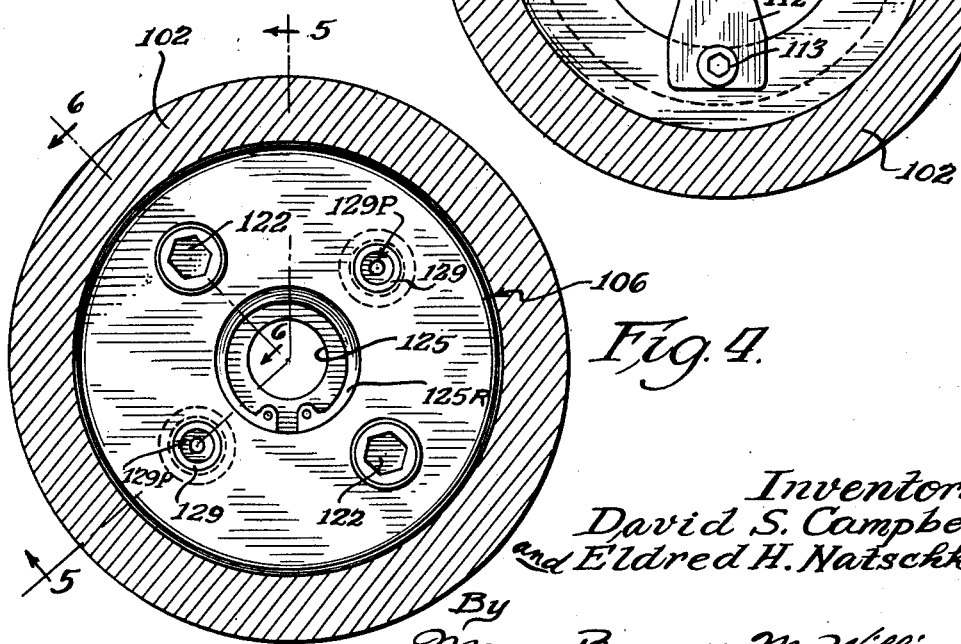
FIG. 4 is a transverse sectional view through the hydraulic cushioning element at a location adjacent its front end and is taken on the line 4—4 of FIG. 1.

In the illustrated arrangement, the piston 106 includes a generally cup-shaped seat 120 integrally carried at the front end of the ram 105 and forming a socket receiving a piston cap 121 that is fixed to the seat by a pair of cap screws 122 (see FIG. 4). A piston ring 123 is held between opposed flanges on the seat 120 and cap 121 and is the only element contacting the cylinder wall. Teflon may be employed for this piston ring because of its ability to act as a lubricant and where silicone fluid is employed the fluid itself is not capable of lubricating. Any other piston ring material known in the art may be employed where desired.

The piston cap 121 is provided with a central orifice opening 121C leading to a forward set of four orifice passages 124A that register with a set of four extension passages 124B in the piston seat 120. An orifice insert ring 125 is fixed within the orifice opening 121C and provides a knife-blade orifice edge to present substantially no friction to fluid moving through the orifice. The insert ring is held in place by a suitable retainer ring 125R.

To facilitate expansion of the hydraulic element to its original full release condition, a central extension passage 125C leads rearwardly from the orifice ring 125 into an axial bore 105B provided at the front end of the ram and from there through radial passages 105R in the ram. The closure characteristics of the hydraulic element are basically controlled by the size of the orifice ring 125 and the additional flow through the radial passages 105P and the bore 105B is of no significance during high speed closure. These latter passages are, however, important in accommodating a sufficiently rapid return stroke without developing excessive pressures in the low pressure chamber.

A pair of pressure relief flow passages 127 (see FIG. 5) lead through the piston to connect the high pressure and low pressure chambers 118 and 119. A relief valve assembly 128 is provided in each passage 127 and is arranged to open if pressure within the high pressure chamber 188 of the cylinder sleeve 102 exceeds some preselected value. Each relief valve assembly, that is shown herein for purposes of illustrative disclosure, includes a chambered valve body 129 threadedly mounted in its passage and having a central inlet port 129P leading to side outlets 129S and then through side channels 129C opening into the low pressure chamber. A needle valve 130 is disposed in the valve body and is resiliently seated in the inlet port 129P by the action of a spring 131 which is controlled by an adjusting screw 132 threaded in the rear of the valve body. Relief valves of other forms may also be employed, if desired.

Figure 7:
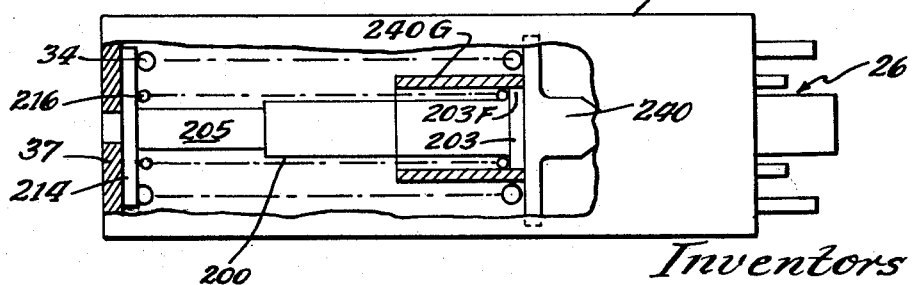
FIG. 7 is a diagrammatic horizontal sectional view illustrating an alternative embodiment of a draft gear in accordance with this invention.

An alternative embodiment of a draft gear in accordance with this invention is illustrated diagrammatically in FIG. 7 and once again includes a friction clutch element 26 in the front of the draft gear housing 22 and including a spring seat 240 acting against a parallel arrangement of a hydraulic cushioning element 200, a main coil spring 34, and corner coil springs (not shown). In this embodiment, the hydraulic cushioning element 200 has its ram 205 equipped with a spring plate 214 at its rear end. The spring plate 214 is wide enough to provide a seat both for a return spring 216 for the hydraulic element and also for the main coil spring 34 which continuously holds this spring plate against the transverse rear wall 37 of the housing.

The return spring 216 extends the full length of the hydraulic element and seats upon an annular flange 203F of its front end cap 203. This cap 203 is loose with respect to the spring seat 240 which is provided with a rearwardly extending cylindrical guide sleeve 240G fixed thereto, either integrally or by welding, for guiding the travel of the front end of the hydraulic element.

During closure of the gear the action is the same as in the FIG. 1 embodiment in that the hydraulic element 200, the main coil spring 34 and the corner coil springs conjointly resist inward movement of the spring seat 240 and thereby set up a force multiplying action through the friction clutch 26. However, during release of the gear of FIG. 7, the spring seat 240 moves forwardly with the friction clutch 26 more rapidly than the hydraulic element 200 can expand. In this instance, the rear end of the hydraulic element remains stationary and the gradual expansion of the element moves its front end forwardly through the guide sleeve 240G and into contact with the spring seat. Therefore, once again the gear restores quickly for handling any secondary shocks and the hydraulic unit is permitted to expand at a controlled rate to avoid dangerous pressures in its low pressure chamber.

For maximum severity service in draft gear applications, it is desired that the reaction force developed by the gear reach its maximum acceptable value very rapidly and hold substantially constant at this value throughout the closure stroke of the gear. This will ensure maximum utilization of the energy absorption characteristics of the gear. In draft gear applications, high energy, high speed closures represent maximum severity service and therefore optimum performance under these high speed conditions is the principal criterion.

In general the fluid pressure developed in the high pressure chamber 118 of the cylinder sleeve 102 should conform approximately to the reaction force characteristics that are desired, however, the hydraulic unit acts in conjunction with the friction clutch and it is the composite characteristic from the joint action of the hydraulic and friction clutch elements that determines the actual reaction force.

Thus, it is important that the friction clutch element and the hydraulic element provide complementary characteristics. By way of example, it is important that the hydraulic element be stiff during initial travel when the initial setup of the friction clutch requires more time. Thereafter, the stiffness value of the hydraulic unit may decrease as the friction clutch becomes progressively more stiff.

In the gear of FIGS. 1 to 6, this general relationship is achieved by utilizing a knife blade orifice ring 125 having a diameter on the order of ⅜″. Assuming such an arrangement is capable of developing 8000 p.s.i. in the high pressure chamber, the relief valves 128 may be set to react at some predetermined lower value, for example, 7000 p.s.i. Then the hydraulic element will be stiff during initial set up of the friction clutch and thereafter will be relieved by the action of the pressure relief valves.

Figure 8:
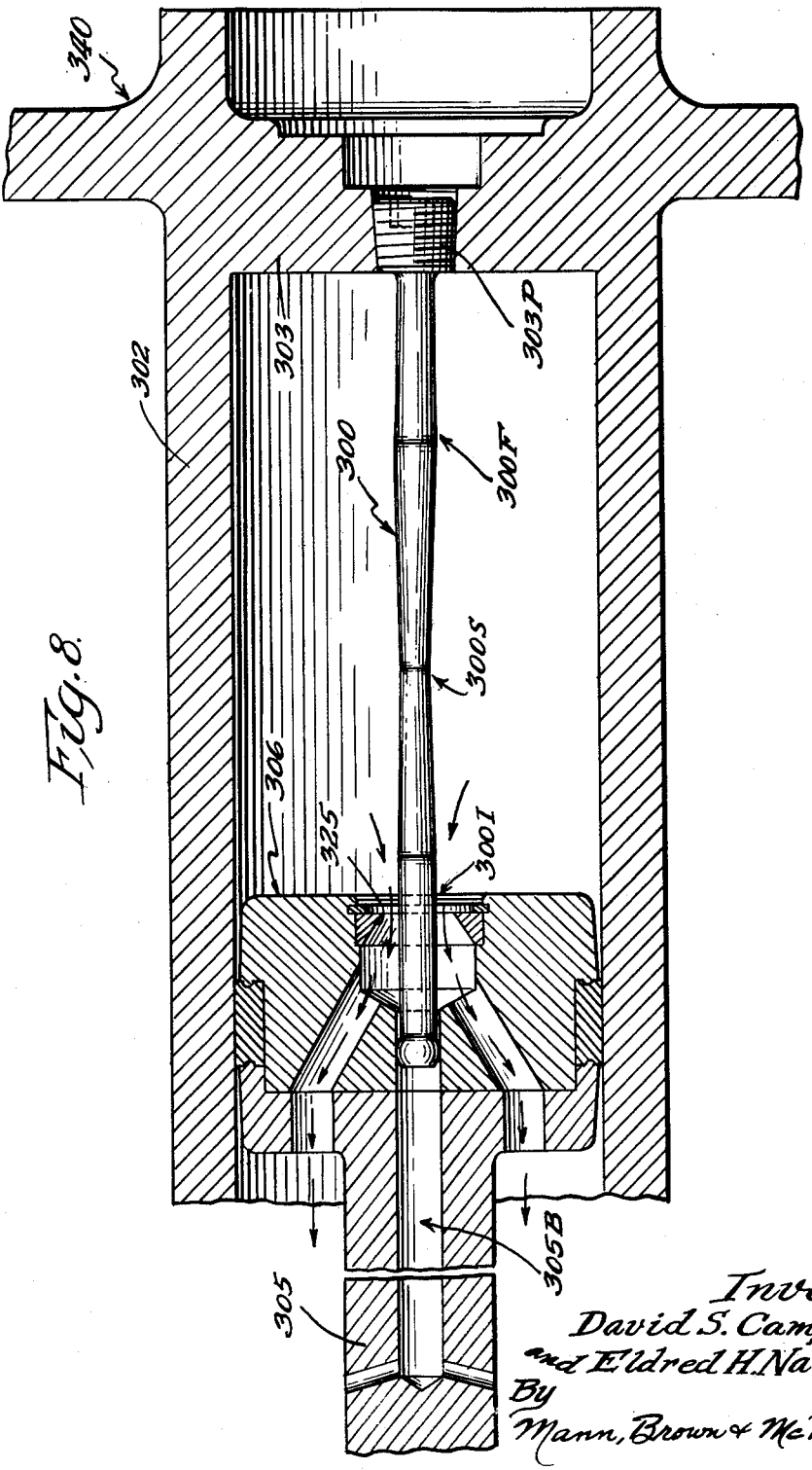
FIG. 8 is an enlarged fragmentary lengthwise section through a hydraulic element employing a metering pin.

A modified arrangement for accomplishing a similar closure action is shown fragmentarily in FIG. 8 wherein the spring seat is designated generally as 340 and includes an integral cylinder sleeve 302 having an integral end cap 303. The ram is shown at 305 and carries a piston 306 having a central orifice defined by a knife blade edge type of orifice insert ring 325. The ram 305 has a greatly elongated central bore 305B to accommodate a metering pin 300 carried as a rigid extension of the fill plug 303P. The free end of the metering pin projects into the bore 305B for free sliding guided relation therewith. The piston structure may otherwise be similar to that shown for the gear of FIGS. 1 to 6.

In FIG. 8 the metering pin gradually tapers from a maximum diameter at the portion 300I which is active when the gear undergoes initial closure travel to a minimum diameter at the portion 300S which is active after the gear has undergone about 2½″ travel and the pin thereafter gradually flares to again reach a maximum diameter at a portion 300F that is active during final closure. Thus, the orifice area is a minimum during initial set up of the friction clutch and provides maximum stiffness at this time. Then as the friction clutch sets up, the hydraulic action is relieved. During the final travel both the hydraulic and the friction clutch elements operate at peak capacity to provide a closure characteristic that blends with the full positive stop characteristic when the front follower strikes the gear housing.

Figure 9:
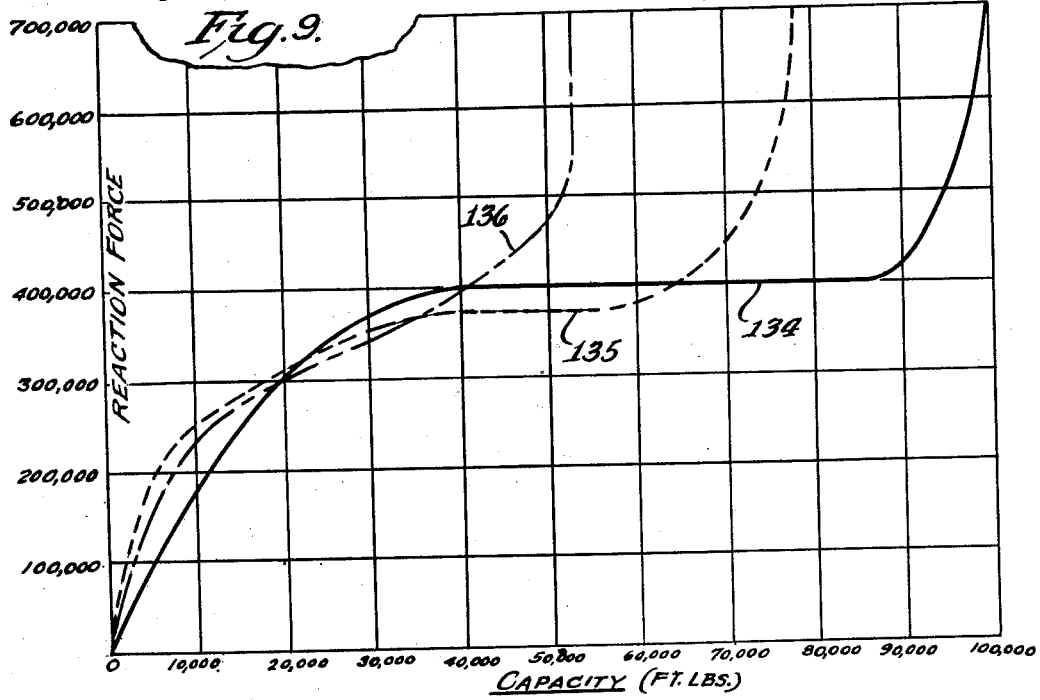
FIG. 9 is a curve showing reaction force v. capacity for the gear of FIGS. 1 to 6 and includes similar curves of a specific prior art gear for purposes of comparison.
Figure 10:
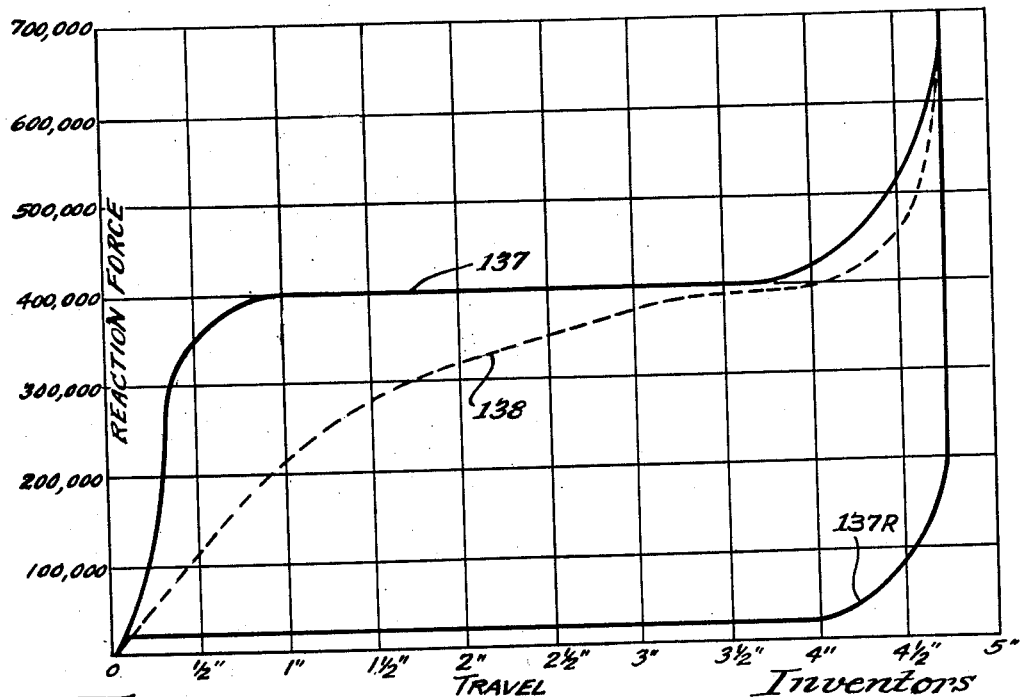
FIG. 10 is a curve showing reaction force v. closure travel for the gear of FIGS. 1 to 6 for a single high velocity blow and includes a similar curve of a specific prior art draft gear.

Performance curves for the gear of FIGS. 1 to 6 are shown in FIGS. 9 and 10.

FIG. 9 is a graph of reaction force v. capacity and shows a curve 134 for the combination hydraulic and friction draft gear of this invention. For purposes of comparison, the performance curve for the gear in the aforesaid Campbell Patent No. 2,916,163 is shown at 135 and the performance curve for this same gear of the Campbell patent, but with its inner coil spring and its intermediate coil spring omitted, is shown at 136. The differences between curves 136 and 134 is accounted for by the hydraulic element.

It is important to note that the curve 136 is applicable if the hydraulic element of the present gear should fail. Thus, the gear will provide a capacity of 54,000 ft. lbs. over a travel of 4½″ without exceeding a reaction force of 500,000 lbs. even though the hydraulic unit has failed and contributes nothing to gear capacity. This provides a substantial safety factor against failure of the hydraulic unit.

FIG. 10 is a graph of reaction force v. closure travel and is taken for a single high velocity blow of about 10½ m.p.h. and curve 137 designates the performance of the gear disclosed herein while curve 138 designates the performance of the gear disclosed in the aforesaid Campbell patent. The curve portion 137R represents the release stroke of the present gear and it may be assumed that curve 138 will have a similar release stroke. The area enclosed by each of the curves 137 and 138 represents the energy dissipation capacity of the gear. The tremendous increase in capacity afforded by the present gear is self-evident from these curves and it should be noted that this is accomplished while maintaining acceptable reaction force values. Moreover, the arrangement of the hydraulic element within the gear is such that the gear may restore very rapidly for resisting secondary buff shocks through its conventional spring system while allowing a gradual recovery of the hydraulic element to limit the pressures acting on the seals for the low pressure chamber 119. All of these factors contribute to a commercially practicable high capacity draft gear arrangement.

Figure 5:
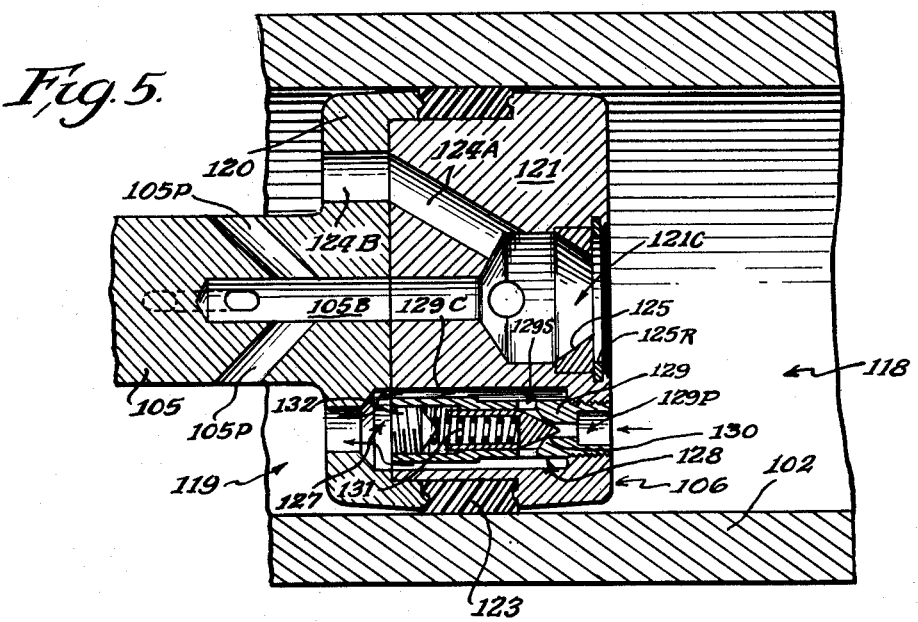
FIG. 5 is a developed sectional view through the piston head region of the hydraulic cushioning element and is taken on the line 5—5 of FIG. 4.
Figure 6:
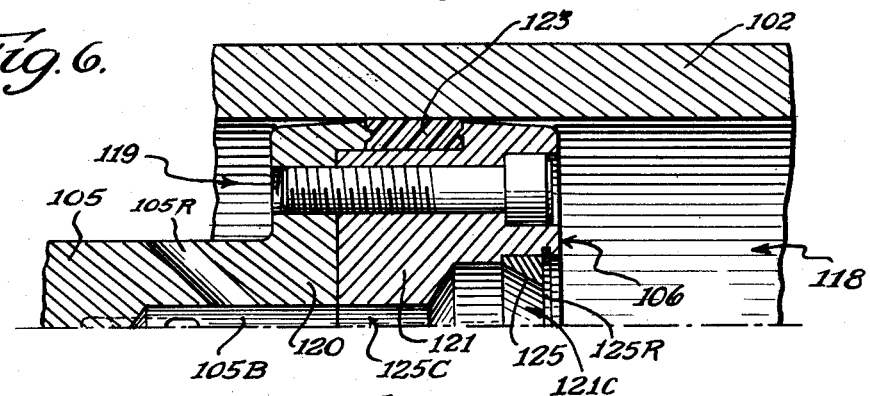
FIG. 6 is a fragmentary sectional view through another plane of the piston head region and is taken on the line 6—6 of FIG. 4.

In a draft gear utilizing a hydraulic cushion element and a friction clutch in force multiplying combination, one practical problem which arises is that the effective friction coefficient of the clutch may vary appreciably dependent upon factors such as extent of useage, weathering, and the like. When the clutch parts are clean, as is the case with a gear that operates frequently, the clutch parts have a high coefficient of friction and the clutch action is efficient. If the clutch parts become rusty or otherwise contaminated, the clutch has a significantly lower coefficient of friction and hence a lower efficiency. Each gear is subject to significant variations in the closure action of its friction clutch and, of course, these variations are accentuated when a large quantity of gears is considered. The fixed open orifice arrangement, such as is shown in FIG. 5, and the variable size metering pin arrangement, such as is shown in FIG. 8, are effective in a hydraulic cushion acting in combination with a friction clutch if the friction clutch has a reasonably constant closure action. However, changes in the clutch efficiency affects the application of load to the hydraulic cushion so that the hydraulic cushion's reaction is different and this acts to set up the clutch so that the entire gear closure characteristic may depart significantly from the intended result.

A more uniform closure characteristic for the composite gear arrangement is provided by utilizing a hydraulic cushion of the general form shown in either FIG. 1 or FIG. 8 wherein the piston head is arranged either as shown in FIGS. 11 to 13 or as shown in FIGS. 15 to 17. In each of these piston head arrangements, a spring loaded orifice pin is disposed in the piston head to intercept the orifice opening and regulate the effective size and flow resistance offered thereby in direct dependence upon the pressure in the high pressure chamber of the hydraulic cushion. The regulating action of the orifice pin is automatic and the response of the pin is determined essentially in accordance with the velocity of the impact but the extent of its response is governed by the action of the friction clutch so that the hydraulic cushioning unit does more work when functioning in combination with a clutch that has a pronounced tendency to slip and does less work when functioning with a clutch that is highly efficient and has a pronounced tendency to grab. The composite force-closure curve of the gear rises quickly to the desired reaction force level and remains substantially at that level throughout the closure stroke.

While the composite reaction force is essentially uniform, the reaction force components attributable to the friction clutch and to the hydraulic cushion are not uniform. Variations in the friction clutch are compensated by variations in the hydraulic unit which adapts automatically through the action of the orifice pin. Thus, the effective capacity of the gear is high and stable even though the performance of the friction clutch may vary at different periods due to the use conditions to which it is subjected.

The closure action of a friction clutch is characterized by high frequency grabbing and slipping during the closure stroke and the orifice pin reacts so rapidly as to adapt automatically to these high frequency shock effects so that the trace of the reaction force curve is substantially smoothed as respects high frequency variations.

In the arrangement of FIGS. 11 to 13, a two part piston 406 is employed and it comprises a generally cup-shaped seat formation 420 carried on the front end of a ram 405 to mate with a piston head or cap 421 that is fixed within the seat by cap screws one of which is shown at 422. A bronze piston ring 423 is held between these parts and projects into contacting relation with the wall of the cylinder 402.

The piston cap 421 has a central orifice passage 421P branching out to a set of flow passages 424A that register with extension passages 424B in the seat 420 to establish communication between the high pressure and low pressure chambers 418 and 419, respectively, of the hydraulic cushion. An insert ring 425 having a knife blade edge defines the actual orifice with an inwardly flared configuration and it is fixed in place in the high pressure mouth of the passage 421P by a retainer ring 425R.

An extension passage arranged axially of the orifice is provided in the piston cap and piston seat to receive an orifice pin 400 in axially slidable relation. The orifice pin has an enlarged head 400H that serves as a seat for a load spring 401 housed in the enlarged end of the extension passage portion that is provided by the piston seat 420. The load spring 401 acts to hold the head 400H of the pin against the rear face of the piston cap 421 to determine an initial position of the metering pin wherein the free end face 400F of the pin is disposed in the plane of the knife edge of the orifice insert 425 for direct exposure to the high pressure chamber 418. This relationship exists when the gear is in its normal release position and thus the orifice opening is of minimum size at the time the gear is initially impacted. The load spring 401 is strong and loads the pin 400 so that no pin movement can occur until the pressure in chamber 418 builds up to about one-half the ultimate operating pressure level that is desired.

The general functioning of the gear as respects the co-operation of the friction clutch, the spring pack (which is not shown in FIG. 11) and the hydraulic cushion element corresponds to that described for the gear of FIG. 1. The composite cushion action developed by the gear during closure is substantially smoothed by virtue of the adaptive action of the orifice pin 400 that creates a greater orifice opening in response to increased pressure in the high pressure chamber.

The orifice pin 400 is in its illustrated position at the time load is initially applied. The orifice opening is then of minimum size and hence its resistance to flow is a maximum so that the hyldraulic element rapidly builds up reaction and enables fast set up of the friction clutch.

The main function of the variable orifice pin is to increase the efficiency of the hydraulic unit operating in conjunction with the friction clutch. The pin provides a minimum orifice initially to enable more rapid build up of pressure in the hydraulic unit and correspondingly to enable more rapid set up of the friction clutch. By this means, the energy dissipation provided by the gear may start at a higher level and start sooner, thereby acting over a longer travel distance and time and increasing the effective capacity.

The pressure developed in the high pressure chamber 418 is essentially dependent upon the closure velocity. The pressure build up and maximum pressure level during the closure stroke is also dependent upon the condition and coefficient of friction of the friction clutch. The pressure build up and level developed in the high pressure chamber in response to a given closure velocity is greater during a closure wherein the friction clutch is relatively inefficient as compared with a closure wherein the friction clutch is efficient. For these different conditions of clutch action, the orifice pin will assume somewhat different positions to cause the hydraulic element to do more work when the friction clutch is inefficient and less work when the friction clutch is efficient. The automatic adaptive action of the orifice pin is operative in the actual working range of the hydraulic element and also serves the added safety function usually performed by separate relief valve facilities. Moreover, the orifice configuration provided in the present arrangement is better controlled and more uniform at all working pressure conditions than is true when separate pressure relief valves are employed.

It will be noted that during the return stroke of the gear, low pressure exists in the high pressure chamber. Accordingly, the orifice pin 400 is fully projected and maximum flow resistance is encountered. Ball check return flow valves designated generally at 426 in FIG. 13 are provided to permit faster return without exceeding the pressure conditions that can be tolerated in the low pressure chamber 419.

Since a gear equipped with a hydraulic piston head arrangement like that of FIG. 11 requires additional return flow facilities such as the ball check valves, it is again preferred to return the hydraulic element separately of the friction clutch and at a substantially slower rate.

FIG. 14 is a graph showing average performance curves for draft gears of the type shown in FIGS. 11 to 13 and includes curves for gears in which the condition of the friction clutch is widely different. Thus, curve 430 is for a gear wherein the friction parts are fully worked-in and clean, having a high coefficient of friction. Curve 431 is for a gear wherein the parts of the friction clutch are in rusty condition. Finally curve 432 is an estimated result for a gear in normal service and is based on an assumed average condition for the parts of the friction clutch.

In the embodiment of FIGS. 15 to 17, the piston head 521 is of one piece construction and is welded in place on the end of the ram 505. An orifice pin 500 floats in an extension passage that communicates with an orifice passage that includes an inlet chamber 521P and a series of branches 524A. A knife blade orifice ring insert 525 is fixed in the mouth of the inlet chamber and defines an inwardly flaring orifice. A strong spring diagrammatically represented at 502 is located in the inlet chamber 521P to react against a shoulder 500S on the pin and normally project the pin into the plane of the knife edge. The pin 500 is provided with a lengthwise slot 500L that cooperates with a cross key 500K secured within the rear of the piston head 521 to limit maximum projection of the pin.

Ball check valve facilities 526 are shown in FIG. 16 in suitable return flow passages provided through the piston head 521 to limit pressures during the return stroke and to facilitate more rapid return of the gear.

This application is filed as a continuation-in-part of pending application Serial No. 153854 filed Nov. 21, 1961 now abandoned.

What is claimed is:

1. A draft gear comprising lengthwise extending housing structure having a stationary follower at one end, a movable follower adjacent the other end of said housing structure and reciprocably movable in a lengthwise direction relative thereto, means for transmitting force between said followers and including a hydraulic cushioning unit and a friction clutch element in lengthwise successive relation in said housing structure, said friction clutch having lengthwise slidable friction engagement against said housing structure to act simultaneously with said hydraulic cushioning unit during closure of the gear, and means for restoring said friction clutch and said hydraulic cushioning unit to release the gear, said hydraulic cushioning unit having a high pressure chamber, a low pressure chamber, and means providing a passage communicating therebetween and having a high pressure end opening through a ring element exposed directly to said high pressure chamber and having an orifice aligned with said passage, a pin element disposed in said passage and having a free end smaller than and centered in said ring element and facing said high pressure chamber, one of said elements being mounted for lengthwise shifting movement into said passage and said elements having cooperating surfaces providing an annular orifice therebetween having a symmetrical configuration that progressively increases in size upon inward shifting movement of said one element and yieldable means in said passage and biasing said one element outwardly towards an orifice narrowing position to allow retraction of said one element and increased opening of said orifice when pressure increases in said high pressure chamber.

2. A draft gear comprising lengthwise extending housing structure having a stationary follower at one end, a movable follower adjacent the other end of said housing structure and reciprocably movable in a lengthwise direction relative thereto, means for transmitting force between said followers and including a hydraulic cushioning element and a friction clutch element in lengthwise successive relation in said housing structure, said friction clutch having means in lengthwise slidable friction engagement against said housing structure to act simultaneously with said hydraulic cushioning element during closure of the gear, and means for restoring said friction clutch and said hydraulic cushioning unit to release the gear, said hydraulic cushioning element having means providing a high pressure chamber, a low pressure chamber, a passage extending therebetween and having a flow restricting orifice exposed directly to said high pressure chamber, a shiftable pin disposed in said passage and having a free end at said orifice and exposed directly to pressure conditions in said high pressure chamber, and yieldable means biasing said pin towards an orifice narrowing position to allow retraction of said pin and increased opening of said orifice when pressure increases in said high pressure chamber.

3. A draft gear comprising lengthwise extending housing structure having a stationary follower at one end, a movable follower adjacent the other end of said housing structure and reciprocably movable in a lengthwise direction relative thereto, means for transmitting force between said followers and including a hydraulic cushioning element and a friction clutch element in lengthwise successive relation in said housing structure, said friction clutch having means in lengthwise slidable friction engagement against said housing structure to act simultaneously with said hydraulic cushioning element during closure of the gear, and means for restoring said friction clutch and said hydraulic cushioning element to release the gear, said hydraulic cushioning element including a cylinder, a ram, a piston fixed on said ram and slideable lengthwise in the cylinder to define high pressure and low pressure chambers on opposite sides of the piston, a passage extending through said piston to establish communication between said chambers, said passage having a flow restricting orifice at one end exposed directly to said high pressure chamber, a pin disposed in lengthwise slideable relation in said piston and having a free end facing said high pressure chamber, and resilient means normally projecting said pin towards the orifice to narrow the effective size of the orifice and to allow expansion of the orifice by retraction of the pin when pressure increases in the high pressure chamber.

4. In a draft gear, lengthwise extending housing structure having a stationary follower at one end, a movable follower at its other end and lengthwise reciprocably movable relative to the housing structure, means for transmitting force between said followers and including a hydraulic cushioning element and a friction clutch element in lengthwise successive relation in said housing structure, said hydraulic cushioning element having means providing a high pressure chamber, a low pressure chamber, a passage extending therebetween and having a flow restricting orifice therein, said orifice being exposed directly to said high pressure chamber and having a configuration that flares internally of the passage, a shiftable pin disposed in said passage and having a free end of smaller transverse area than said orifice and located at said orifice for exposure directly to pressure conditions in said high pressure chamber, a load spring biasing said pin towards the high pressure chamber to allow retraction of said pin and opening of said orifice when pressure increases in said high pressure chamber, said friction clutch having lengthwise slidable friction engagement against said housing structure to act simultaneously with said hydraulic cushioning element during closure of the gear, and means for restoring said friction clutch and said hydraulic cushioning unit to release the gear.

5. In a draft gear, lengthwise extending housing structure having a stationary follower at one end, a movable follower at its other end and lengthwise reciprocably movable relative to the housing structure, means for transmitting force between said followers and including a hydraulic cushioning element and a friction clutch element in lengthwise successive relation in said housing structure, said hydraulic cushioning element including a cylinder, a ram relatively lengthwise shiftable in the cylinder and defining, in conjunction with the cylinder, a variable volume high pressure fluid chamber, means engaged between the ram and cylinder to sealingly connect the same in relatively slidable relation and to define cooperatively therewith a low pressure fluid chamber, means providing an orifice in a passage leading between said chambers, a shiftable element normally occupying an orifice narrowing position in said passage and responsive to an increase in pressure conditions in said high pressure chamber to move in a direction to increase the size of the orifice, said friction clutch having lengthwise slidable friction engagement against said housing structure to act simultaneously with said hydraulic cushioning element during closure of the gear, and means for restoring said friction clutch and said hydraulic cushioning unit to release the gear.

6. In a draft gear, lengthwise extending housing structure having a stationary follower at one end, a movable follower at its other end and lengthwise reciprocably movable relative to the housing structure, means for transmitting force between said followers and including a hydraulic cushioning element and a friction clutch element in lengthwise successive relation in said housing structure, said hydraulic cushioning element including a cylinder, a ram relatively lengthwise shiftable in the cylinder and defining, in conjunction with the cylinder, a variable volume high pressure fluid chamber, means engaged between the ram and cylinder to sealingly connect the same in relatively slidable relation and to define cooperatively therewith a low pressure fluid chamber, means providing a passage leading between said chambers and having an orifice adjacent the high pressure chamber and having an orifice configuration that flares in a direction leading into the passage, a shiftable pin disposed in said passage and having a free end of smaller transverse area than said orifice and located at said orifice for direct exposure to pressure conditions in said high pressure chamber, a load spring carried in said ram and acting with predetermined initial force upon said pin to move said pin towards said orifice to establish a minimum orifice opening and to allow expansion of the orifice by retraction of the pin when pressure in the high pressure chamber increases beyond a predetermined value determined by the initial force of said spring and the effective transverse area of said pin, said friction clutch having lengthwise slidable friction engagement against said housing structure to act simultaneously with said hydraulic cushioning element during closure of the gear, and means for restoring said friction clutch and said hydraulic cushioning unit to release the gear.

7. A draft gear comprising lengthwise extending housing structure having a stationary follower at one end, a lengthwise reciprocably movable follower at its other end, means for transmitting force between said followers and including a hydraulic cushioning element and a friction clutch element in lengthwise successive relation in said housing structure, said friction clutch having means in lengthwise slidable friction engagement against said housing structure to act simultaneously with said hydraulic cushioning element during closure of the gear, and means for restoring said friction clutch and said hydraulic cushioning unit to release the gear, said hydraulic cushioning element having means providing a high pressure chamber, a low pressure chamber, a passage extending therebetween and having a high pressure end opening through a ring element exposed directly to said high pressure chamber and having an orifice aligned with said passage, a pin element disposed in said passage and having a free end centered in said ring element and facing said high pressure chamber, one of said elements being mounted for lengthwise shifting movement into said passage and said elements having cooperating surfaces providing an annular orifice therebetween having a configuration that progressively increases in size upon inward shifting movement of said one element and yieldable means in said passage and biasing said one element outwardly towards an orifice narrowing position to allow retraction of said element and increased opening of said orifice when pressure increases in said high pressure chamber.

8. A draft gear comprising lengthwise extending housing structure having a stationary follower at one end, a lengthwise reciprocably movable follower at its other end, means for transmitting force between said followers and including a hydraulic cushioning element and a friction clutch element in lengthwise successive relation in said housing structure, said friction clutch having means in lengthwise slidable friction engagement against said housing structure to act simultaneously with said hydraulic cushioning element during closure of the gear, and means for restoring said friction clutch and said hydraulic cushioning element to release the gear, said hydraulic cushioning element including a cylinder, a ram, a piston fixed on said ram and slidable lengthwise in the cylinder to define high pressure and low pressure chambers on opposite sides of the piston, a passage extending through said piston to establish communication between said chambers, said piston having a ring element in one end of said passage for direct exposure to said high pressure chamber and defining a flow restricting opening for said passage, a pin element in said piston and disposed in said passage and having a free end centered in said ring element and facing said high pressure chamber, one of said elements being mounted for lengthwise shifting movement into said passage and said elements having cooperating surfaces providing an annular orifice therebetween having a configuration that progressively increases in size upon inward shifting movement of said one element and resilient means in said piston projecting along said passage and abutting said one element to yieldably hold said one element towards the high pressure chamber and allow retraction of said one element and increased opening of said orifice when pressure increases in said high pressure chamber.

9. In a draft gear, lengthwise extending housing structure having a stationary follower at one end, a movable follower at its other end lengthwise reciprocably movable relative to the housing structure, means for transmitting force between said followers and including a hydraulic cushioning element and a friction clutch element in lengthwise successive relation in said housing structure, said hydraulic cushioning element including a cylinder, a ram, a piston fixed on the ram and slidable lengthwise in the cylinder to define in conjunction with the cylinder and ram high pressure and low pressure chambers on opposite sides of the piston, said piston having a passage extending therethrough to establish communication between said chambers, said piston having a ring element in one end of said passage for direct exposure to said high pressure chamber and defining a flow restricting opening for said passage, a pin element in said piston and disposed in said passage and having a free end centered in said ring element and facing said high pressure chamber, one of said elements being mounted for lengthwise shifting movement into said passage and said elements having cooperative surfaces providing an annular orifice therebetween having a configuration that progressively increases in size upon inward shifting movement of said one element and a load spring carried in said piston and projecting along said passage to act with predetermined initial force upon said one element and hold said one element towards said high pressure chamber to establish a minimum size orifice initially, with said load spring being yieldable to allow retraction of said one element into said passage and corresponding increase in effective size of the orifice when pressure in the high pressure chamber increases beyond a predetermined value determined by the initial force of said spring and the effective transverse area of said one element, said friction clutch having lengthwise slidable friction engagement against said housing structure to act simultaneously with said hydraulic cushioning element during closure of the gear, and means for restoring said friction clutch and said hydraulic cushioning unit to release the gear.

10. In a draft gear, in combination a friction clutch having means for translating a predetermined proportion of a lengthwise force applied therethrough into a friction creating force resisting gear closure and a hydraulic cushioning unit interengaged to said friction clutch to cause reaction to closure developed by the hydraulic unit to act lengthwise on said friction clutch to enable establishment of a friction creating force by the friction clutch in response to application of a load to the gear, said hydraulic cushioning unit having a high pressure chamber, a low pressure chamber and means providing a passage communicating therebetween and having a high pressure end opening through a ring element exposed directly to said high pressure chamber and having an orifice aligned with said passage, a pin element disposed in said passage and having a free end smaller than and centered in said ring element and facing said high pressure chamber, one of said elements being mounted for lengthwise shifting movement into said passage and said elements having cooperating surfaces providing an annular orifice therebetween having a symmetrical configuration that progressively increases in size upon inward shifting movement of said one element and yieldable means in said passage and biasing said one element outwardly towards an orifice narrowing position to allow retraction of said one element and increased opening of said orifice when pressure increases in said high pressure chamber.

11. In a draft gear, lengthwise extending housing structure having a stationary follower at one end and having a movable follower adjacent its other end and reciprocably movable in a lengthwise direction relative thereto, means for transmitting force from one follower to the other and comprising a spring cushioning element and a hydraulic cushioning element extending in parallel lengthwise relation and disposed between said followers for opposing movement of one follower towards the other, and a friction clutch element lengthwise slidably engaged in said housing structure in interposed operative relation between said movable follower and both cushioning elements for conjointly compressing both cushioning elements during closure of the gear, said friction clutch including a longitudinally movable plunger abutting said movable follower, an intermediate spring seat abutting said cushioning elements, and wedge shoes between and engaging said plunger and spring seat to develop outwardly directed transverse forces in response to longitudinal loading of said clutch, said spring cushioning element being compressible by movement of said friction clutch during closure of said gear to expand upon release of said gear and return said friction clutch at a predetermined rate, said hydraulic cushioning element having cooperating piston and cylinder means relatively slidable in fluid throttling relation in a direction lengthwise relative to said housing structure and including a separate return spring reacting between said piston and cylinder means to urge the same towards full release position for expanding said hydraulic element at a controlled rate substantially less than said predetermined rate and said hydraulic cushioning element having one end free of other parts of said gear to accommodate lengthwise separation of said last named end relative to said other parts during return of said friction clutch element by said spring cushioning element.

12. In a draft gear, lengthwise extending housing structure having a stationary follower at one end and having a movable follower at its other end and reciprocably movable in a lengthwise direction relative thereto, means for transmitting force from one follower to the other and comprising a spring cushioning element and a hydraulic cushioning element extending in parallel lengthwise relation and disposed between said followers for opposing movement of one follower towards the other, and a friction clutch element of the force multiplying type lengthwise slidable engaged in said housing structure in interposed operative relation between said movable follower and both cushioning elements for conjointly compressing both cushioning elements during closure of the gear, said friction clutch element having a wedge system acting against the resistance presented by said cushioning elements to set up lateral frictional forces in proportion to such resistance and including a longitudinally movable plunger abutting said movable follower, an intermediate spring seat abutting said cushioning elements, and wedge shoes between and engaging said plunger and spring seat to develop outwardly directed transverse forces in response to longitudinal loading of said clutch, said spring cushioning element being compressible by movement of said friction clutch during closure of said gear to expand upon release of said gear and return said friction clutch at a predetermined rate, said hydraulic cushioning element having cooperating piston and cylinder means relatively slidable in fluid throttling relation in a direction lengthwise relative to said housing structure and including a separate return spring reacting between said piston and cylinder means to urge the same towards full release position for expanding said hydraulic element at a controlled rate substantially less than said predetermined rate and said hydraulic cushioning element having one end free of other parts of said gear to accommodate lengthwise separation of said last named end relative to said other parts during return of said friction clutch element by said spring cushioning element.

13. In a draft gear, lengthwise extending housing structrue having a stationary follower at one end and having a movable follower at its other end and reciprocably movable in a lengthwise direction relative thereto, means for transmitting force from one follower to the other and comprising a spring cushioning element and a hydraulic cushioning element extending in parallel lengthwise relation and disposed between said followers for opposing movement of one follower towards the other, said hydraulic cushioning element including a cylinder, a ram relatively lengthwise slidable in the cylinder and defining, in conjunction with the cylinder, a variable volume high pressure fluid chamber, and means between the ram and cylinder for defining a low pressure fluid chamber communicating with the high pressure chamber, and a friction clutch element lengthwise slidably engaged in said housing structure in interposed operative relation between said movable follower and both cushioning elements for conjointly compressing both cushioning elements during closure of the gear, said friction clutch including a longitudinally movable plunger abutting said movable follower, an intermediate spring seat abutting said cushioning elements, and wedge shoes between and engaging said plunger and spring seat to develop outwardly directed transverse forces in response to longitudinal loading of said clutch, said spring cushioning element being compressible by movement of said friction clutch during closure of said gear to expand upon release of said gear and return said friction clutch at a predetermined rate, said hydraulic cushioning element being compressible by movement of said friction clutch during closure of said gear to develop increased pressure in said high pressure chamber and gradually expel fluid to said low pressure chamber, said hydraulic cushioning element including a separate return spring reacting between said cylinder and said ram to urge the same towards full release position for expanding said hydraulic element at a controlled rate substantially less than said predetermined rate in order to limit fluid pressure in said low pressure chamber and said hydraulic cushioning element having one end free of other parts of said gear to accommodate lengthwise separation of said last named end relative to said other parts during return of said friction clutch element by said spring cushioning element.

14. In a draft gear, lengthwise extending housing structure having a stationary follower at one end and having a movable follower at its other end and reciprocably movable in a lengthwise direction relative thereto, means for transmitting force from one follower to the other and comprising a spring cushioning element and a hydraulic cushioning element extending in parallel lengthwise relation and disposed between said followers for opposing movement of one follower towards the other, said hydraulic cushioning element including a cylinder, a ram relatively lengthwise slidable in the cylinder and defining, in conjunction with the cylinder, a variable volume high pressure fluid chamber, and means between the ram and cylinder for defining a low pressure fluid chamber communicating with the high pressure chamber, and a friction clutch element of the force multiplying type lengthwise slidably engaged in said housing structure in interposed operative relation between said movable follower and both cushioning elements for conjointly compressing both cushioning elements during closure of the gear, said friction clutch element having a wedge system acting against the resistance presented by said cushioning elements to set up lateral frictional forces in proportion to such resistance and including a longitudinally movable plunger abutting said movable follower, an intermediate spring seat abutting said cushioning elements, and wedge shoes between and engaging said plunger and spring seat to develop outwardly directed transverse forces in response to longitudinal loading of said clutch, said spring cushioning element being compressible by movement of said friction clutch during closure of said gear to expand upon release of said gear and return said friction clutch a predetermined rate, said hydraulic cushioning element being compressible by movement of said friction clutch during closure of said gear to develop increased pressure in said high pressure chamber gradually expel fluid to said low pressure chamber, said hydraulic cushioning element including a separate return spring for reacting between said piston and cylinder means to urge the same towards full release position for expanding said hydraulic element at a controlled rate substantially less than said predetermined rate in order to limit fluid pressure in said low pressure chamber and said hydraulic cushioning element having one end free of other parts of said gear to accommodate lengthwise separation of said last named end relative to said other parts during return of said friction clutch element by said spring cushioning element.

15. In a draft gear, lengthwise extending housing structure having a stationary follower at one end, a hydraulic cushioning element of the hydraulic fluid throttling type lengthwise contractible in said housing and reacting against said follower, a main coil spring encircling said element, and extending coextensive therewith, and a friction clutch lengthwise slidably engaged in said housing and including an intermediate spring seat operatively engaging both the hydraulic element and the coil spring for conjointly compressing the same during gear closure, said coil spring being compressible by movement of said friction clutch during closure of said gear to expand upon release of said gear and return said friction clutch at a predetermined rate, said hydraulic cushioning element having cooperating piston and cylinder means relatively slidable in fluid throttling relation in a direction lengthwise relative to said housing structure and including a separate return spring reacting between said piston and cylinder means to urge the same towards full release position for expanding said hydraulic element at a controlled rate substantially less than said predetermined rate and said hydraulic cushioning element having one end free of other parts of said gear to accommodate lengthwise separation of said last named end relative to said other parts during return of said friction clutch element by said main coil spring.

16. The arrangement of claim 15 and wherein said hydraulic element includes a cooperating ram and cylinder normally urged apart by said return spring and said cylinder is engaged to and jointly movable with said intermediate spring seat, with said ram being free to follow release movement of said cylinder with said spring seat.

17. The arrangement of claim 15 and wherein said hydraulic element includes a cooperating ram and cylinder normally urged apart by said return spring, said ram having a radially projecting spring seat rigid therewith and engaged by said main coil spring to hold said ram against said stationary follower, and said cylinder being free of said intermediate spring seat to undergo release movement independently thereof.

18. In a draft gear, lengthwise extending housing structure having a fixed follower at one end, a spring cushioning element of a positive resistance type and a hydraulic cushioning element of a fluid throttling type extending in parallel lengthwise relation in said housing structure to react at one end against said follower, and a friction clutch element lengthwise slidably disposed in said housing structure in operative engagement to both cushioning elements for conjointly compressing said cushioning elements during movement of said friction element occasioned by closure of the gear, said hydraulic cushioning element having cooperating piston and cylinder means relatively slidable in fluid throttling relation in a direction lengthwise relative to said housing structure and including a separate return spring reacting between said piston and cylinder means to urge the same towards full release position for expanding the hydraulic cushioning, and said hydraulic cushioning element having one end free of other parts of the gear to accommodate lengthwise separation relative thereto, said spring cushioning element and hydraulic cushioning element being positioned between said fixed follower and said friction clutch element to maintain said spring cushion element and said return spring precompressed when said gear is in its release position and to subject said spring cushioning element and said return spring to further compression during closure of said gear, said spring cushioning element being sufficiently stronger than said return spring to expand upon release of said gear for returning said friction clutch element faster than said return spring can expand and return said hydraulic cushioning element.

19. In a draft gear, lengthwise extending housing structure having a fixed follower at one end, a spring cushioning element of a positive resistance type and a hydraulic cushioning element of a fluid throttling type extending in parallel lengthwise relation in said housing structure to react at one end against said follower, said hydraulic element including a cylinder, a ram and piston jointly slidable relatively lengthwise through one end of the cylinder to form a variable volume high pressure chamber leading through a throttling passage to a low pressure chamber, and a friction clutch element lengthwise slidably disposed in said housing structure in operative engagement to both cushioning elements for conjointly compressing said cushioning elements during movement of said friction element occasioned by closure of the gear, said hydraulic cushioning element having cooperating piston and cylinder means relatively slidable in fluid throttling relation in a direction lengthwise relative to said housing structure and including a separate return spring reacting between said piston and cylinder means to urge the same towards full release position for expanding the hydraulic cushioning and said hydraulic cushioning element having one end free of other parts of the gear to accommodate lengthwise separation relative thereto, said spring cushioning element and hydraulic cushioning element being positioned between said fixed follower and said friction clutch element to maintain said spring cushion element and said return spring precompressed when said gear is in its release position and to subject said spring cushioning element and said return spring to further compression during closure of said gear, said spring cushioning element being sufficiently stronger than said return spring to expand upon release of said gear for returning said friction clutch element faster than said return spring can expand and return said hydraulic cushioning element.

20. In a draft gear, lengthwise extending housing structure having a stationary follower at one end and having a movable follower at its other end and reciprocably movable in a lengthwise direction relative thereto, means for transmitting force from one follower to the other and comprising a spring cushioning element and a hydraulic cushioning element extending in parallel lengthwise relation and disposed between said followers for opposing movement of one follower towards the other, said hydraulic cushioning element having means including a cylinder, a ram, and a piston fixed on said ram and shiftable lengthwise in the cylinder to define in the cylinder high pressure and low pressure chambers disposed on opposite sides of the piston, said piston having an orifice passage structure establishing communication between said chambers and presenting an effective orifice area that varies from a minimum at a full release position of the gear to a maximum at an intermediate closure position of the gear, and a friction clutch element lengthwise slidably engaged in said housing structure in interposed operative relation between said movable follower and both cushioning elements for conjointly compressing both cushioning elements during closure of the gear, said spring cushioning element being compressible by movement of said friction clutch during closure of said gear to expand upon release of said gear and return said friction clutch at a predetermined rate, said hydraulic cushioning element being compressible by movement of said friction clutch during closure of said gear to develop increased pressure in said high pressure chamber and gradually expel fluid to said low pressure chamber, said hydraulic cushioning element including a separate return spring for expanding said hydraulic element at a controlled rate substantially less than said predetermined rate in order to limit fluid pressure in said low pressure chamber and said hydraulic cushioning element having one end free of other parts of said gear to accommodate lengthwise separation of said last named end relative to said other parts during return of said clutch element by said spring cushioning element.

21. Intermediate spring seat structure for a draft gear that includes separate spring and hydraulic cushioning units disposed in parallel to provide conjoint reaction for a friction clutch, said intermediate spring seat structure comprising a one piece casting having a transverse base plate portion providing a seat for said spring cushioning unit, a box-shaped portion integral with and extending forwardly of said base plate portion and providing wedge faces coacting with parts of said friction clutch, and a centrally located cylinder sleeve portion projecting rearwardly from said base plate portion and providing boundary walls of a high pressure chamber of the hydraulic cushioning element.

22. The spring seat structure of claim 21 wherein said cylinder sleeve portion includes a transverse end cap portion having a central fill opening and removable plug for the high pressure chamber.

23. In a draft gear, lengthwise extending housing structure having a stationary follower at one end and having a movable follower at its other end and reciprocably movable in a lengthwise direction relative thereto, means for transmitting force from one follower to the other and comprising a spring cushioning element and a hydraulic cushioning element extending in parallel lengthwise relation and disposed between said followers for opposing movement of one follower towards the other and a friction clutch element lengthwise slidably engaged in said housing structure in interposed operative relation between said movable follower and both cushioning elements for conjointly compressing both cushioning elements during closure of the gear, said friction clutch including a longitudinally movable plunger abutting said movable follower, an intermediate spring seat abutting said cushioning elements, and wedge shoes between and engaging said plunger and spring seat to develop outwardly directed transverse forces in response to longitudinal loading of said clutch, said spring cushioning element being compressible by movement of said friction clutch during closure of said gear to expand upon release of said gear and return said friction clutch at a predetermined rate, said hydraulic cushioning element having cooperating piston and cylinder means relatively slidable in fluid throttling relation in a direction lengthwise relative to said housing structure and including a separate return spring reacting between said piston and cylinder means to urge the same towards full release position for expanding said hydraulic element at a controlled rate substantially less than said predetermined rate and said hydraulic cushioning element having one end free of other parts of said gear to accommodate independent full stroke relative lengthwise movement of said last named end with respect to said other parts during return of said friction clutch element by said spring cushioning element.

References Cited in the file of this patent

UNITED STATES PATENTS

| | | |
|---|---|---|
| 2,865,396 | Focht | Dec. 23, 1958 |
| 2,948,413 | Zanow | Aug. 9, 1960 |
| 2,987,311 | Schilling et al. | June 6, 1961 |
| 2,994,442 | Frederick | Aug. 1, 1961 |
| 3,085,796 | Wettstein | Apr. 16, 1963 |